United States Patent
Zhu

(10) Patent No.: US 11,750,496 B2
(45) Date of Patent: Sep. 5, 2023

(54) METHOD FOR MULTI-CLOUD INTERCONNECTION AND DEVICE

(71) Applicant: Huawei Cloud Computing Technologies Co., Ltd., Guizhou (CN)

(72) Inventor: Xiaoping Zhu, Beijing (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 0 days.

(21) Appl. No.: 17/858,346

(22) Filed: Jul. 6, 2022

(65) Prior Publication Data

US 2022/0337506 A1 Oct. 20, 2022

Related U.S. Application Data

(63) Continuation of application No. PCT/CN2020/121987, filed on Oct. 19, 2020.

(30) Foreign Application Priority Data

Jan. 7, 2020 (CN) .......................... 202010015135.0

(51) Int. Cl.
*H04L 45/02* (2022.01)
*H04L 43/0852* (2022.01)
*H04L 67/10* (2022.01)

(52) U.S. Cl.
CPC .......... *H04L 45/02* (2013.01); *H04L 43/0852* (2013.01); *H04L 67/10* (2013.01)

(58) Field of Classification Search
CPC ...... H04L 45/02; H04L 43/0852; H04L 67/10
(Continued)

(56) References Cited

U.S. PATENT DOCUMENTS 10,355,989 B1 7/2019 Panchal et al.
11,252,126 B1 * 2/2022 Thunga ................... H04L 45/48
(Continued)

FOREIGN PATENT DOCUMENTS

CN 104518967 A 4/2015
CN 106888143 A 6/2017
(Continued)

OTHER PUBLICATIONS

Hiroaki H et al: "Dynamic IP-VPN architecture for cloud computing", Information and Telecommunication Technologies (APSITT), 2010 8th Asia-Pacific Symposium ON, IEEE, Jun. 15, 2010 (Jun. 15, 2010), Total 5 Pages.

*Primary Examiner* — Ruolei Zong
(74) *Attorney, Agent, or Firm* — WOMBLE BOND DICKINSON (US) LLP

(57) ABSTRACT

This application discloses a method for multi-cloud interconnection, including: receiving identification information of a first device deployed on a first VPC; determining, based on the identification information of the first device, a first edge node, that is configured to connect to the first VPC, among a plurality of network nodes; sending identification information of the first edge node to the first device, where the identification information of the first edge node is used by the first device to create a connection between the first device and the first edge node; and determining a forwarding path that is between the first edge node and a second edge node and that is used to forward a packet between the first VPC and a second VPC, where the second edge node is a network node, that is configured to connect to the second VPC, among the plurality of network nodes.

16 Claims, 9 Drawing Sheets

(58) Field of Classification Search
USPC .......................................................... 709/238
See application file for complete search history.

(56) References Cited

U.S. PATENT DOCUMENTS

| | | | |
|---|---|---|---|
| 11,374,794 B2* | 6/2022 | Hira ........................ | H04L 45/72 |
| 2015/0339136 A1* | 11/2015 | Suryanarayanan ..... | G06F 9/452 |
| | | | 718/1 |
| 2019/0124704 A1 | 4/2019 | Sun et al. | |
| 2019/0238449 A1 | 8/2019 | Michael et al. | |
| 2019/0327175 A1 | 10/2019 | Ying et al. | |
| 2020/0067733 A1* | 2/2020 | Hira .................... | H04L 12/4633 |
| 2020/0213224 A1* | 7/2020 | Cheng .................... | H04L 45/04 |
| 2020/0322249 A1* | 10/2020 | Liu ..................... | H04L 43/0805 |

FOREIGN PATENT DOCUMENTS

| | | | | |
|---|---|---|---|---|
| CN | 107517488 A | | 12/2017 | |
| CN | 108270621 A | | 7/2018 | |
| CN | 108449197 A | | 8/2018 | |
| CN | 108551464 A | | 9/2018 | |
| CN | 108574615 A | | 9/2018 | |
| CN | 108696895 A | | 10/2018 | |
| CN | 109379241 A | | 2/2019 | |
| CN | 110138887 A | | 8/2019 | |
| CN | 110224886 A | | 9/2019 | |
| CN | 110391982 A | | 10/2019 | |
| CN | 110401588 A | * | 11/2019 | ......... H04L 12/4641 |
| CN | 110535930 A | | 12/2019 | |
| WO | 2019164907 A1 | | 8/2019 | |

\* cited by examiner

METHOD FOR MULTI-CLOUD INTERCONNECTION AND DEVICE

CROSS-REFERENCE TO RELATED APPLICATIONS

This application is a continuation of International Application No. PCT/CN2020/121987, filed on Oct. 19, 2020, which claims priority to Chinese Patent Application No. 202010015135.0, filed on Jan. 7, 2020. The disclosures of the aforementioned applications are hereby incorporated by reference in their entireties.

TECHNICAL FIELD

This application relates to the field of computer technologies, and in particular, to a method for multi-cloud interconnection and a device.

BACKGROUND

To improve availability of a service and overall performance of the service, a user usually deploys the service on a plurality of clouds. For example, the user separately deploys different functions of a service 1 on m (where m is an integer greater than 1) virtual private clouds (VPCs). In this case, the m VPCs need to be interconnected for communication, to implement the functions of the service 1. Subnets of the m VPCs do not overlap.

Currently, when interconnection between the m VPCs is implemented, full interconnection between the m VPCs is implemented through a fully interconnected tunnel created between virtual customer premises equipments (vCPEs) respectively deployed on the m VPCs. For example, as shown in FIG. 1, if four VPCs need to be interconnected, the user deploys a vCPE 1 on a VPC 1, a vCPE 2 on a VPC 2, a vCPE 3 on a VPC 3, and a vCPE 4 on a VPC 4. Then, fully interconnected tunnels are created between the vCPE 1, the vCPE 2, the vCPE 3, and the vCPE 4, to implement interconnection between the four VPCs.

However, a quantity of fully interconnected tunnels created between vCPEs is related to a quantity of the VPCs. For the m VPCs, m×(m−1)/2 fully interconnected tunnels need to be created. In other words, a large quantity of tunnels is created. In addition, in the conventional technology, a route of a tunnel between the vCPEs needs to be manually configured. Therefore, a configuration workload is heavy. For example, for the vCPE 1 in FIG. 1, the vCPE 1 needs to separately create tunnels to the vCPE 2, the vCPE 3, and the vCPE 4, that is, the vCPE 1 needs to separately configure routes to the vCPE 2, the vCPE 3, and the vCPE 4.

SUMMARY

This application provides a method for multi-cloud interconnection and a device, to help reduce a quantity of created tunnels and reduce a workload of configuring a tunnel route between vCPEs during multi-cloud interconnection.

To achieve the objectives, this application provides the following technical solutions.

According to a first aspect, this application provides a method for multi-cloud interconnection. The method is applied to a management and control device, and the management and control device is configured to manage a plurality of network nodes. The method includes: receiving identification information of a first device deployed on a first virtual private cloud VPC; determining a first edge node based on the identification information of the first device, where the first edge node is a network node, that is configured to connect to the first VPC, among the plurality of network nodes; sending identification information of the first edge node to the first device, where the identification information of the first edge node is used by the first device to create a connection between the first device and the first edge node; and determining a forwarding path between the first edge node and a second edge node in the plurality of network nodes, where the second edge node is a network node, that is configured to connect to a second VPC, among the plurality of network nodes, and the forwarding path is used to forward a packet between the first VPC and the second VPC.

In this technical solution, the forwarding path used to forward the packet between the first VPC and the second VPC is determined in the plurality of network nodes managed by the management and control device, and the forwarding path forms a cloud acceleration network for interconnecting the first VPC and the second VPC. In an embodiment, when m VPCs need to be interconnected, the management and control device may determine a forwarding path between every two VPCs of the m VPCs, and these forwarding paths form a cloud acceleration network for interconnecting the m VPCs. Therefore, on one hand, when the m VPCs are interconnected by using the cloud acceleration network, in this application, only a connection between each of the m VPCs and an edge node corresponding to the VPC needs to be created, without creating a fully interconnected connection between the m VPCs as in the conventional technology. In this way, when a VPC that needs to be interconnected is newly added, a connection between the VPC and an edge node is created by using the method for multi-cloud interconnection provided in this application, without creating a connection between the VPC and each of the m VPCs as in the conventional technology. On another hand, the method for multi-cloud interconnection provided in this application reduces a route configuration workload of a routing device (for example, a vCPE) deployed on a VPC. For example, in the conventional technology, if m VPCs are interconnected, for a vCPE deployed on one VPC, the vCPE needs to separately create tunnels to m−1 vCPEs, that is, routes to the m−1 vCPEs need to be manually configured for the vCPE separately. However, in this application, only a connection between the vCPE and an edge node in a cloud acceleration network needs to be created, that is, only a route from the vCPE to the edge node connected to the vCPE needs to be configured.

With reference to the first aspect, in an embodiment, the "determining a first edge node based on the identification information of the first device" includes: obtaining network latency between each of at least two network nodes of the plurality of network nodes and the first device based on the identification information of the first device, and determining the first edge node based on the network latency between each of the at least two network nodes and the first device. For example, the management and control device may use, as the first edge node, a network node, that has minimum network latency with the first device, among the plurality of network nodes, or use, as the first edge node, a network node, that has network latency less than a threshold with a first network device, among the plurality of network nodes. This helps reduce network latency between the first device and the first edge node.

With reference to the first aspect, in an embodiment, the at least two network nodes are network nodes, that are at a distance less than or equal to a first preset distance from the first device, in the plurality of network nodes. In other words, in this application, the first edge node may be determined in some of the plurality of network nodes. In this way, processing complexity of the management and control device can be reduced, and the network latency between the first device and the first edge node can be reduced.

With reference to the first aspect, in an embodiment, the first edge node includes a first primary edge node and a first secondary edge node, and the second edge node includes a second primary edge node and a second secondary edge node. In this case, the "determining a forwarding path between the first edge node and a second edge node in the plurality of network nodes" includes: determining a primary forwarding path between the first primary edge node and the second primary edge node in the plurality of network nodes, and determining a secondary forwarding path between the first secondary edge node and the second secondary edge node in the plurality of network nodes. Herein, there is no shared network node between the primary forwarding path and the secondary forwarding path.

In this case, the path for forwarding the packet between the first VPC and the second VPC includes the primary forwarding path and the secondary forwarding path. Herein, the primary forwarding path is used for load bearing, and the secondary forwarding path is used for redundancy and backup. When the primary forwarding path works normally, the secondary forwarding path does not participate in packet forwarding. When the primary forwarding path cannot forward the packet due to a failure or system maintenance, the secondary forwarding path forwards the packet between the first VPC and the second VPC instead of the primary forwarding path. In other words, introduction of the secondary forwarding path improves reliability of multi-cloud interconnection, and ensures quality of a multi-cloud service.

With reference to the first aspect, in an embodiment, network latency between the first primary edge node and the first device is less than or equal to network latency between the first secondary edge node and the first device. Network latency between the second primary edge node and a second device is less than or equal to network latency between the second secondary edge node and the second device, and the second device is deployed on the second VPC. In this case, the first primary edge node and the second primary edge node are included in the primary forwarding path, and the first secondary edge node and the second secondary edge node are included in the secondary forwarding path. In other words, when the network latency between the first primary edge node and the first device is less than or equal to the network latency between the first secondary edge node and the first device, and the network latency between the second primary edge node and the second device is less than or equal to the network latency between the second secondary edge node and the second device, network latency of the primary forwarding path is reduced.

With reference to the first aspect, in an embodiment, network latency of the primary forwarding path is less than or equal to network latency of the secondary forwarding path. In this case, the network latency of the primary forwarding path used for load bearing is low, and this helps improve efficiency of forwarding the packet between the first VPC and the second VPC.

With reference to the first aspect, in an embodiment, the method for multi-cloud interconnection may further include: The management and control device delivers routing information to each network node on the determined forwarding path between the first edge node and the second edge node.

In this way, the management and control device automatically configures a route between the first edge node and the second edge node. Compared with the conventional technology in which a route on a vCPE is manually configured, this application improves route configuration efficiency.

With reference to the first aspect, in an embodiment, the method for multi-cloud interconnection may further include: periodically updating the forwarding path between the first edge node and the second edge node. For example, a forwarding path having minimum network latency between the first edge node and the second edge node is periodically determined, and the forwarding path is updated to the forwarding path used to forward the packet between the first VPC and the second VPC. In this way, efficiency of forwarding the packet between the first VPC and the second VPC can be improved.

According to a second aspect, this application provides a method for multi-cloud interconnection. The method is applied to a first device, and the first device is deployed on a first virtual private cloud VPC. The method includes: sending identification information of the first device to a management and control device, where the identification information of the first device is used by the management and control device to determine a first edge node among a plurality of network nodes managed by the management and control device, and the first edge node is a network node, that is configured to connect to the first VPC, among the plurality of network nodes; receiving identification information of the first edge node sent by the management and control device; and creating a connection between the first device and the first edge node based on the identification information of the first edge node, where herein, a packet between the first VPC and a second VPC is forwarded through a forwarding path, the forwarding path is a path between the first edge node and a second edge node in the plurality of network nodes, and the second edge node is a network node, that is configured to connect to the second VPC, among the plurality of network nodes.

With reference to the second aspect, in an embodiment, the first edge node includes a first primary edge node and a first secondary edge node, and the second edge node includes a second primary edge node and a second secondary edge node. In this case, the "creating a connection between the first device and the first edge node based on the identification information of the first edge node" includes: creating a connection between the first device and the first primary edge node based on identification information of the first primary edge node, and creating a connection between the first device and the first secondary edge node based on identification information of the first secondary edge node. Herein, the forwarding path includes a primary forwarding path and a secondary forwarding path, the primary forwarding path is a path between the first primary edge node and the second primary edge node, the secondary forwarding path is a path between the first secondary edge node and the second secondary edge node, and there is no shared network node between the primary forwarding path and the secondary forwarding path.

With reference to the second aspect, in an embodiment, network latency between the first primary edge node and the first device is less than or equal to network latency between the first secondary edge node and the first device. Network latency between the second primary edge node and a second device is less than or equal to network latency between the second secondary edge node and the second device. Herein, the second device is deployed on the second VPC.

With reference to the second aspect, in an embodiment, network latency of the primary forwarding path is less than or equal to network latency of the secondary forwarding path.

With reference to the second aspect, in an embodiment, the method for multi-cloud interconnection further includes: The first device configures a route to the first edge node. In this way, when the first device receives a to-be-forwarded packet sent by the first VPC, the first device may send the to-be-forwarded packet to the first edge node based on the route, so that the first edge node forwards the to-be-forwarded packet to the second VPC through the forwarding path between the first edge node and the second edge node.

According to a third aspect, this application provides a management and control device. The management and control device is configured to manage a plurality of network nodes.

In an embodiment, the management and control device may be configured to perform any method provided in the first aspect. In this application, division into function modules may be performed on the management and control device according to any method provided in the first aspect. For example, each function module may be obtained through division based on a corresponding function, or two or more functions may be integrated into one processing module. For example, in this application, the management and control device may be divided into a receiving unit, a determining unit, and a sending unit based on the functions. For descriptions of possible technical solutions performed by the foregoing function modules obtained through division and beneficial effects achieved by the foregoing function modules, refer to the technical solutions provided in the first aspect or corresponding possible designs of the first aspect. Details are not described herein again.

In an embodiment, the management and control device includes a memory and one or more processors. The memory is coupled to the processor. The memory is configured to store computer program code, and the computer program code includes computer instructions. When the computer instructions are executed by the management and control device, the management and control device is enabled to perform the method for multi-cloud interconnection according to the first aspect and any one of the possible design manners of the first aspect.

According to a fourth aspect, this application provides a first device. The first device is deployed on a first virtual private cloud VPC.

In an embodiment, the first device may be configured to perform any method provided in the second aspect. In this application, division into function modules may be performed on the first device according to any method provided in the second aspect. For example, each function module may be obtained through division based on a corresponding function, or two or more functions may be integrated into one processing module. For example, in this application, the first device may be divided into a sending unit, a receiving unit, and a determining unit based on the functions. For descriptions of possible technical solutions performed by the foregoing function modules obtained through division and beneficial effects achieved by the foregoing function modules, refer to the technical solutions provided in the second aspect or corresponding possible designs of the second aspect. Details are not described herein again.

In an embodiment, the first device includes a memory and one or more processors. The memory is coupled to the processor. The memory is configured to store computer program code, and the computer program code includes computer instructions. When the computer instructions are executed by the first device, the first device is enabled to perform the method for multi-cloud interconnection according to the second aspect and any one of the possible design manners of the second aspect.

According to a fifth aspect, this application provides a chip system. The chip system is applied to a management and control device, and the chip system includes one or more interface circuits and one or more processors. The interface circuit and the processor are interconnected through a line. The interface circuit is configured to receive a signal from a memory of the management and control device, and send the signal to the processor. The signal includes computer instructions stored in the memory. When the processor executes the computer instructions, the management and control device performs the method for multi-cloud interconnection according to the first aspect and any one of the possible design manners of the first aspect.

According to a sixth aspect, this application provides a chip system. The chip system is applied to a first device, and the chip system includes one or more interface circuits and one or more processors. The interface circuit and the processor are interconnected through a line. The interface circuit is configured to receive a signal from a memory of the first device, and send the signal to the processor. The signal includes computer instructions stored in the memory. When the processor executes the computer instructions, the first device performs the method for multi-cloud interconnection according to the second aspect and any one of the possible design manners of the second aspect.

According to a seventh aspect, this application provides a computer-readable storage medium. The computer-readable storage medium includes computer instructions. When the computer instructions are run on a management and control device, the management and control device is enabled to implement the method for multi-cloud interconnection according to the first aspect and any one of the possible design manners of the first aspect.

According to an eighth aspect, this application provides a computer-readable storage medium. The computer-readable storage medium includes computer instructions. When the computer instructions are run on a first device, the first device is enabled to implement the method for multi-cloud interconnection according to the second aspect and any one of the possible design manners of the second aspect.

According to a ninth aspect, this application provides a computer program product. When the computer program product runs on a management and control device, the management and control device is enabled to perform the method for multi-cloud interconnection according to the first aspect and any one of the possible design manners of the first aspect.

According to a tenth aspect, this application provides a computer program product. When the computer program product runs on a first device, the first device is enabled to perform the method for multi-cloud interconnection according to the second aspect and any one of the possible design manners of the second aspect.

For detailed descriptions of the second aspect to the tenth aspect and various implementations thereof in this application, refer to detailed descriptions of the first aspect and the various implementations thereof. In addition, for beneficial effects of the second aspect to the tenth aspect and the various implementations thereof, refer to the analysis of beneficial effects of the first aspect and the various implementations thereof. Details are not described herein again.

In this application, names of the management and control device and the first device do not constitute a limitation on the devices or the function modules. In actual implementation, the devices or the function modules may appear with other names. The devices or the function modules fall within the scope of the claims in this application and their equivalent technologies, provided that functions of the devices or the function modules are similar to those in this application.

These aspects or other aspects in this application are more concise and comprehensible in the following descriptions.

DESCRIPTION OF EMBODIMENTS

In embodiments of this application, the word "example", "for example", or the like is used to represent giving an example, an illustration, or a description. Any embodiment or design scheme described as an "example" or with "for example" in embodiments of this application should not be explained as being more preferred or having more advantages than another embodiment or design scheme. Exactly, use of the word "example", "for example", or the like is intended to present a related concept in an embodiment.

The terms "first" and "second" in embodiments of this application are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of this application, unless otherwise specified, "a plurality of" means two or more than two.

Figure 1:
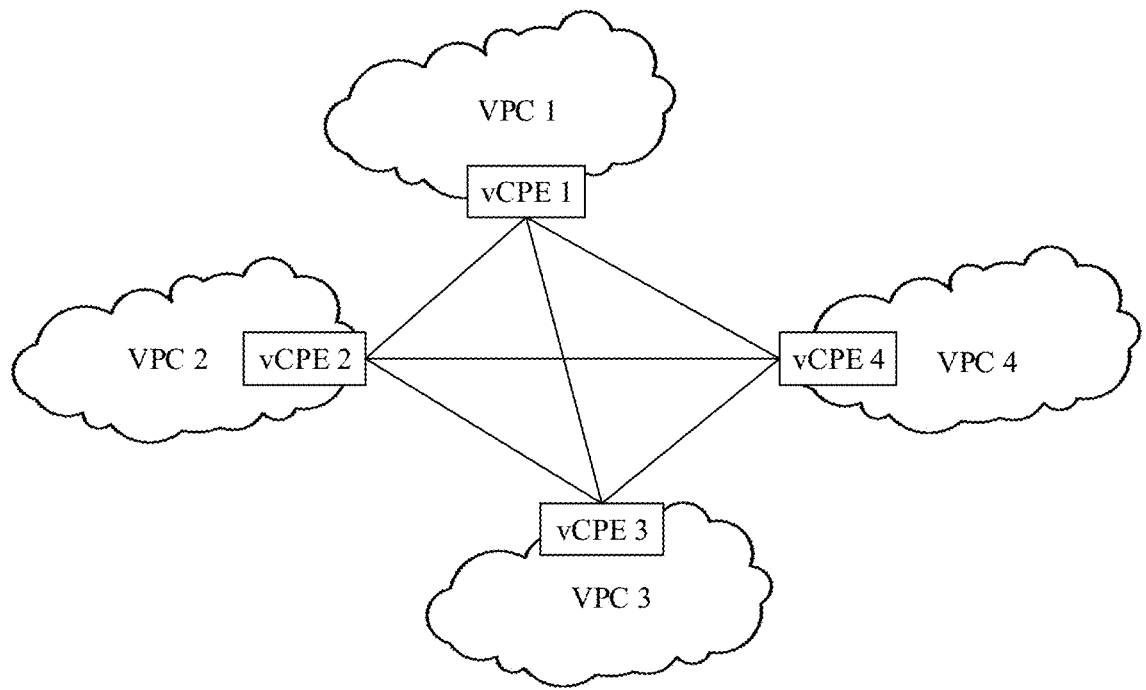
FIG. 1 is a schematic diagram in which multi-cloud interconnection is implemented in the conventional technology.
Figure 2:
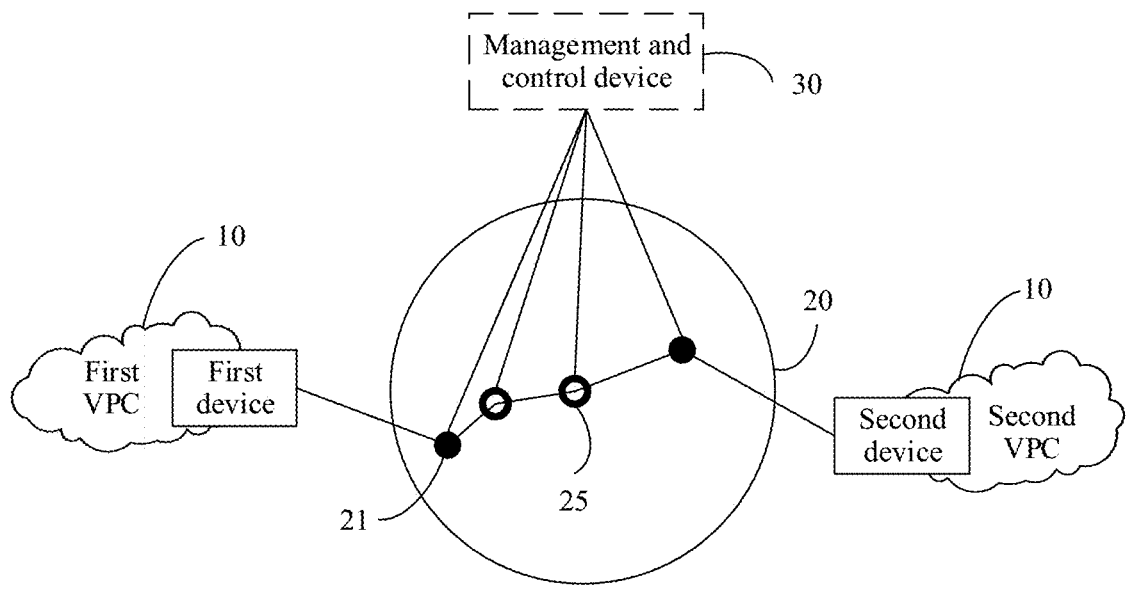
FIG. 2 is a diagram of an architecture of a system for multi-cloud interconnection according to an embodiment of this application.

FIG. 2 is a schematic diagram of an architecture of a system for multi-cloud interconnection according to an embodiment of this application. The system for multi-cloud interconnection shown in FIG. 2 includes at least two VPCs 10 and a cloud acceleration network (CAN) 20 used to interconnect the at least two VPCs 10. In an embodiment, the system for multi-cloud interconnection may further include a management and control device 30 configured to create the cloud acceleration network 20.

A routing device is deployed on each VPC 10. The routing device may be a vCPE, or may be another virtualized device that has a routing function or a gateway function, or may be a physical routing device, a gateway device, or the like. This is not limited in an embodiment of the application. If the routing device is a virtualized device, the routing device may be implemented by using a segment of program code that is run on a computer device. In the following descriptions, an example in which the routing device is a vCPE is used for description in an embodiment of the application. The vCPE implements functions of the vCPE by using a program run on a virtual machine or a physical machine.

For example, the at least two VPCs 10 include a first VPC and a second VPC. For ease of description, in an embodiment of the application, a routing device deployed on the first VPC is referred to as a first device, and a routing device deployed on the second VPC is referred to as a second device. Interconnection between the first VPC and the second VPC may be implemented by interconnecting the first device and the second device.

The management and control device 30 is configured to manage a plurality of network nodes. The management and control device 30 may be a device, for example, a general-purpose computer or a server, or may be a general-purpose computer group or a server group, or may be any other device that can implement a function of the management and control device in an embodiment of the application. This is not limited in this application. A network node may include a physical machine or a virtual machine.

The cloud acceleration network 20 may be an overlay network based on a public cloud. In this case, the management and control device 30 may be a management and control device on the public cloud. The public cloud includes a plurality of network nodes. The management and control device on the public cloud is configured to manage the plurality of network nodes, for example, determine a network node, that interconnects the at least two VPCs 10, among the plurality of network nodes, and establish a forwarding path of the at least two VPCs 10 by using the determined network node.

For ease of description, in an embodiment of the application, network nodes in the cloud acceleration network 20 are classified into an edge node and a forwarding node. The edge node is a network node that is in the cloud acceleration network 20 and that is directly connected to a routing device on a VPC. For example, the edge node may be a network node 21 shown by a solid circle in FIG. 2. The forwarding node is a network node that is in the cloud acceleration network 20 and that is indirectly connected to the routing device on the VPC. For example, the forwarding node may be a network node 25 shown by a hollow circle in FIG. 2. The edge node and the forwarding node each may be any network node on the public cloud.

Figure 3:
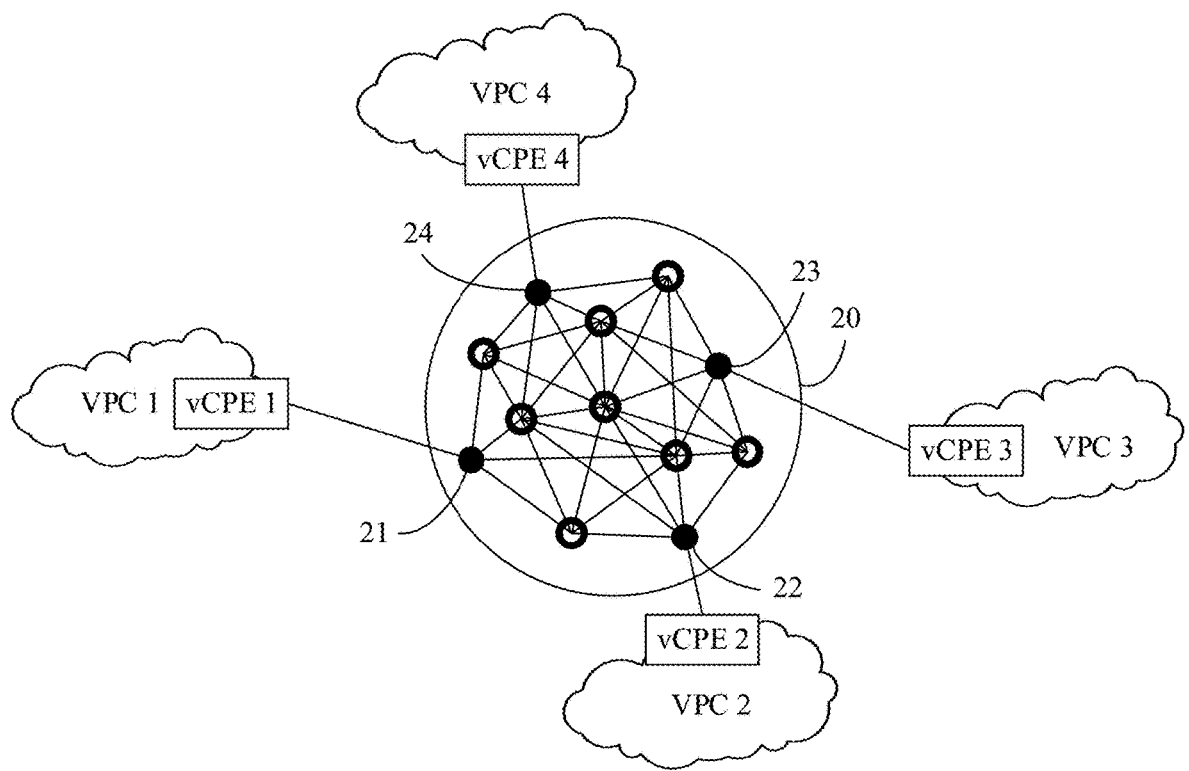
FIG. 3 is a schematic flowchart I of multi-cloud interconnection according to an embodiment of this application.

FIG. 3 shows a network for multi-cloud interconnection according to an embodiment of this application. As shown in FIG. 3, the network for multi-cloud interconnection includes a VPC 1, a VPC 2, a VPC 3, a VPC 4, and a cloud acceleration network 20 used to interconnect the VPC 1, the VPC 2, the VPC 3, and the VPC 4. A vCPE 1 is deployed on the VPC 1, and the vCPE 1 is connected to the cloud acceleration network by using an edge node 21. A vCPE 2 is deployed on the VPC 2, and the vCPE 2 is connected to the cloud acceleration network by using an edge node 22. A vCPE 3 is deployed on the VPC 3, and the vCPE 3 is connected to the cloud acceleration network by using an edge node 23. A vCPE 4 is deployed on the VPC 4, and the vCPE 4 is connected to the cloud acceleration network by using an edge node 24. A packet between any two VPCs may be forwarded through a forwarding path between two edge nodes corresponding to the two VPCs. Herein, the forwarding path between the two edge nodes may include n network forwarding nodes (where the n network forwarding nodes include the two edge nodes and a forwarding node between the two edge nodes), where n is a positive integer greater than or equal to 2.

Figure 4:
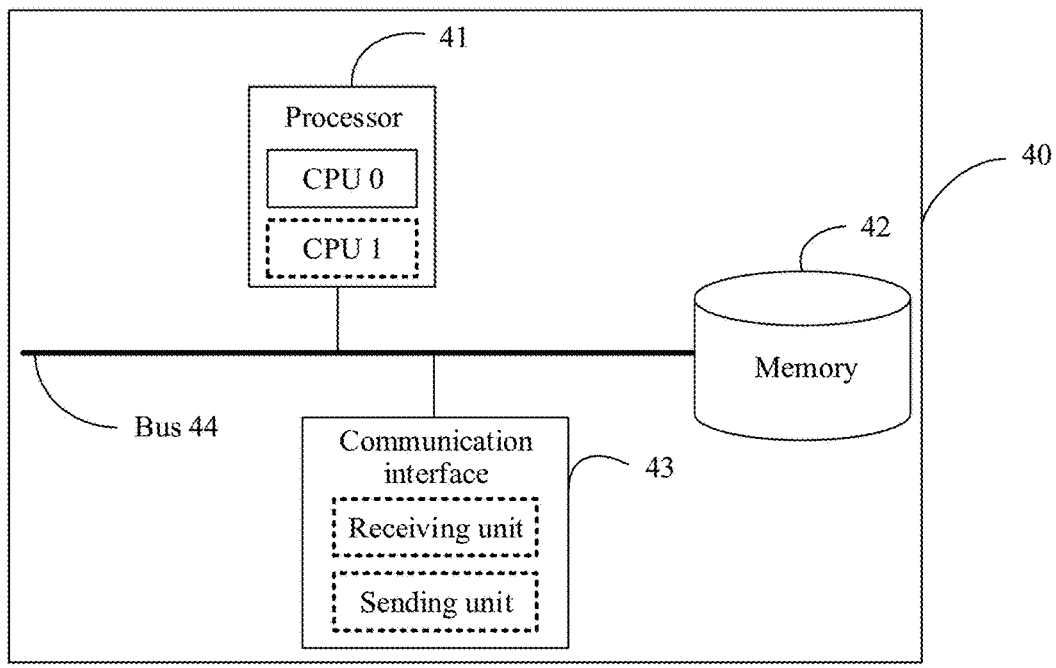
FIG. 4 is a diagram of a structure of hardware of a computer device according to an embodiment of this application.

FIG. 4 shows a structure of hardware of a computer device according to an embodiment of this application. The computer device 40 may be the foregoing computer device configured to run a function executed by the routing device on the VPC, or may be the foregoing management and control device, or may be the foregoing network node. As shown in FIG. 4, the computer device 40 includes a processor 41, a memory 42, a communication interface 43, and a bus 44. The processor 41, the memory 42, and the communication interface 43 may be connected through the bus 44.

The processor 41 is a control center of the computer device 40, and may be a general-purpose central processing unit (CPU), another general-purpose processor, or the like. The general-purpose processor may be a microprocessor, any conventional processor, or the like.

In an example, the processor 41 may include one or more CPUs, for example, a CPU 0 and a CPU 1 that are shown in FIG. 4.

The memory 42 may be a read-only memory (ROM) or another type of static storage device capable of storing static information and instructions, a random access memory (RAM) or another type of dynamic storage device capable of storing information and instructions, an electrically erasable programmable read-only memory (EEPROM), a magnetic disk storage medium or another magnetic storage device, or any other medium capable of carrying or storing expected program code in a form of an instruction or data structure and capable of being accessed by a computer, but is not limited thereto.

In in an embodiment, the memory 42 may be independent of the processor 41. The memory 42 may be connected to the processor 41 through the bus 44, and is configured to store data, instructions, or program code. When the processor 41 invokes and executes the instructions or the program code stored in the memory 42, the method for multi-cloud interconnection provided in embodiments of this application can be implemented.

In an embodiment, the memory 42 may be alternatively integrated with the processor 41.

The communication interface 43 is configured to connect the computer device 40 to another device (for example, a network node in a public cloud) by using a communication network. The communication network may be the Ethernet, a radio access network (RAN), a wireless local area network (WLAN), or the like. The communication interface 43 may include a receiving unit configured to receive data and a sending unit configured to send data.

The bus 44 may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 4, but this does not mean that there is only one bus or only one type of bus.

It should be noted that the structure shown in FIG. 4 does not constitute a limitation on the management and control device. In addition to the components shown in FIG. 4, the computer device 40 may include more or fewer components than those shown in the figure, or some components may be combined, or there may be a different component layout.

It should be noted that a quantity of edge nodes on the cloud acceleration network 20 is related to a quantity of interconnected VPCs. If there are m interconnected VPCs, the quantity of edge nodes on the cloud acceleration network 20 is m or 2 m, where m is a positive integer greater than or equal to 2.

The following describes the method for multi-cloud interconnection provided in embodiments of this application with reference to the accompanying drawings.

Embodiment 1

In an embodiment, m VPCs are interconnected by using a cloud acceleration network, where m is a positive integer greater than or equal to 2. A first VPC requests to access the cloud acceleration network, to implement interconnection between the first VPC and each of the m VPCs. A first device, for example, a first vCPE, is deployed on the first VPC.

Figure 5:
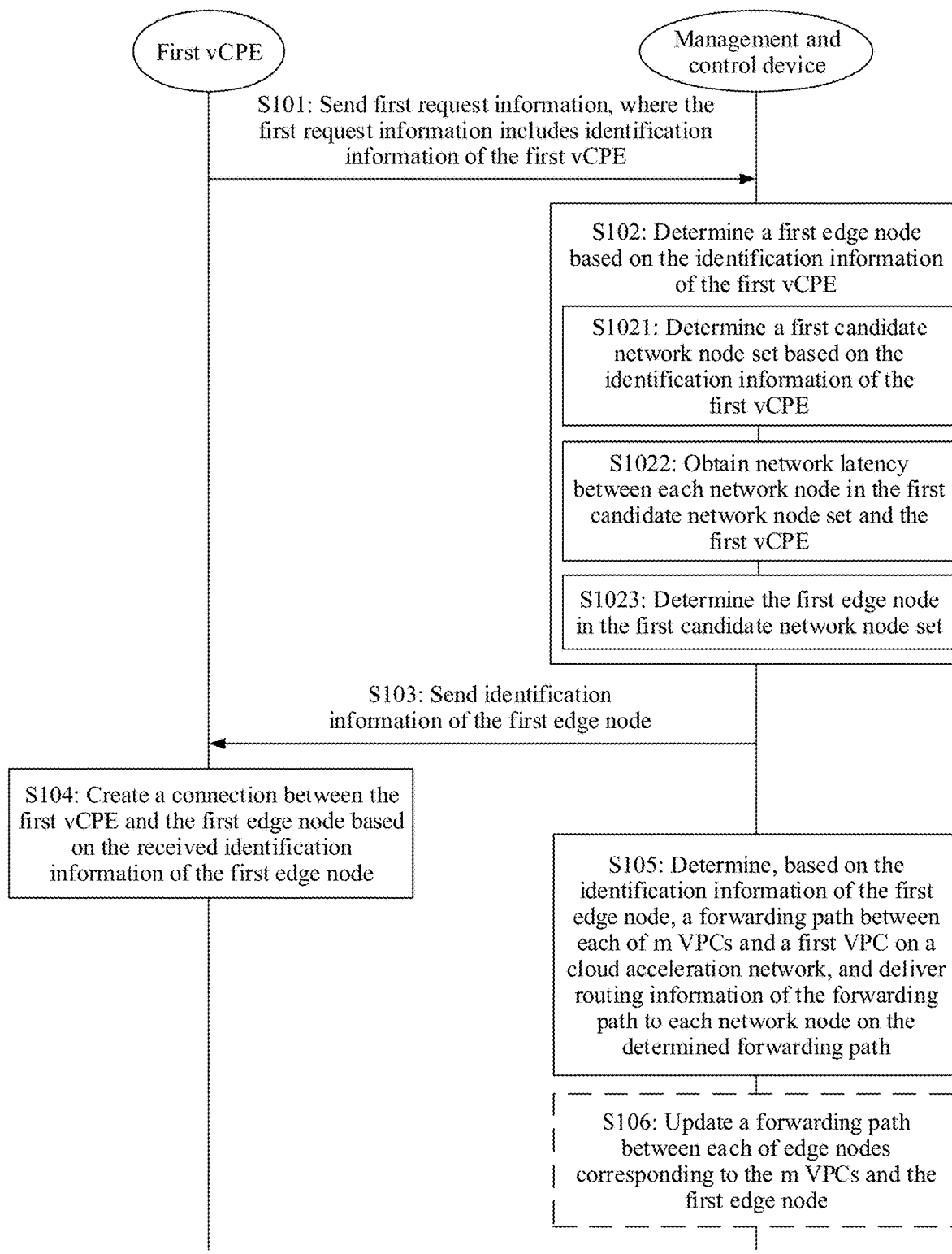
FIG. 5 is a schematic flowchart I of a method for multi-cloud interconnection according to an embodiment of this application.

In this case, a flowchart of a method for multi-cloud interconnection provided in an embodiment of this application may be shown in FIG. 5. The method shown in FIG. 5 includes the following operations.

S101: The first vCPE sends first request information to a management and control device, where the first request information includes identification information of the first vCPE.

The first vCPE is deployed on the first VPC. When the first vCPE determines that the first VPC needs to access a cloud acceleration network, the first vCPE sends the first request information to the management and control device. The first request information is used to request to access the cloud acceleration network.

The identification information of the first vCPE may be an Internet protocol (IP) address of the first vCPE on a public network.

The management and control device receives the first request information in response to the operation of the first vCPE.

S102: The management and control device determines a first edge node based on the identification information of the first vCPE.

The first edge node is a network node, that is configured to connect to the first vCPE, among a plurality of network nodes managed by the management and control device. In other words, the first edge node is the network node, that is configured to connect to the first VPC, among the plurality of network nodes managed by the management and control device.

In an embodiment, the management and control device may determine the first edge node according to the following operations.

S1021: The management and control device determines a first candidate network node set based on the identification information of the first vCPE.

In an embodiment, the management and control device may determine, based on a regional location identified by the identification information of the first vCPE, the first candidate network node set in the plurality of managed network nodes. The first candidate network node set includes a network node that is at a distance less than or equal to a preset distance from the first vCPE.

It should be noted that the network node in the first candidate network node set may include at least one of an edge node corresponding to each of the m VPCs.

S1022: The management and control device obtains network latency between each network node in the first candidate network node set and the first vCPE.

In an embodiment, the management and control device sends the identification information of the first vCPE to each network node in the first candidate network node set, and indicates each network node that receives the identification information of the first vCPE to detect the network latency between the network node and the first vCPE. Each network node that receives the identification information of the first vCPE detects the network latency between the network node and the first vCPE, and reports a detection result to the management and control device.

For an embodiment in which the network node detects the network latency between the network node and the first vCPE, refer to the conventional technology. Details are not described herein. For example, the network node may detect the network latency between the network node and the first vCPE by using a ping command.

In response to the operation of the first candidate network node set, the management and control device obtains a network latency result reported by each network node in the first candidate network node set, and stores the network latency result into a latency database.

S1023: The management and control device determines the first edge node in the first candidate network node set.

The first VPC and the m VPCs are VPCs leased by a same user from different service providers. Therefore, the management and control device may determine, based on a security level of the user, a quantity of edge nodes configured to connect each VPC to the cloud acceleration network. If the security level of the user is a first security level, the management and control device determines that the quantity of edge nodes configured to connect each VPC to the cloud acceleration network is 1. If the security level of the user is a second security level, the management and control device determines that the quantity of edge nodes configured to connect each VPC to the cloud acceleration network is 2, and the two edge nodes include a primary edge node and a secondary edge node. The first security level is lower than the second security level, and a higher security level indicates a better redundancy capability of the cloud acceleration network.

The management and control device may determine the first edge node in the first candidate network node set by using any one of the following implementations.

In an embodiment, if the security level of the user is the first security level, the management and control device determines, in the first candidate network node set based on the obtained network latency result reported by each network node in the first candidate network node set, a network node that has minimum network latency with the first vCPE as the first edge node.

In an embodiment, if the level of the user is the second security level, the management and control device may determine a first primary edge node and a first secondary edge node based on the obtained network latency result reported by each network node in the first candidate network node set.

In an embodiment, if a quantity of the network nodes, that have the minimum network latency with the first vCPE, in the first candidate network node set is greater than or equal to 2, the management and control device determines any one of the network nodes, that have the minimum network latency with the first vCPE, in the first candidate network node set as the first primary edge node, and determines, as the first secondary edge node, any one of the network nodes, that have the minimum network latency with the first vCPE, in the first candidate network node set other than the network node determined as the first primary edge node. If a quantity of the network nodes, that have the minimum network latency with the first vCPE, in the first candidate network node set is 1, the management and control device determines the network node that has the minimum network latency as the first edge node, and determines a network node that has second minimum network latency with the first vCPE as a first secondary edge node. In other words, network latency between the first primary edge node and the first vCPE is less than or equal to network latency between the first secondary edge node and the first vCPE.

S103: The management and control device sends identification information of the first edge node to the first vCPE.

In an embodiment, the management and control device sends the identification information of the first edge node determined in S102 to the first vCPE, so that the first vCPE can create a connection between the first vCPE and the first edge node based on the identification information of the first edge node. Based on this, the first vCPE receives the identification information of the first edge node in response to the operation of the management and control device.

In an embodiment, the first edge node includes the first primary edge node and the first secondary edge node. In this case, the management and control device sends both identification information of the first primary edge node and identification information of the first secondary edge node to the first vCPE. Based on this, the first vCPE receives the identification information of the first primary edge node and the identification information of the first secondary edge node in response to the operation of the management and control device.

S104: The first vCPE creates the connection between the first vCPE and the first edge node based on the received identification information of the first edge node.

In an embodiment, the first vCPE may create a tunnel between the first vCPE and the first edge node based on the received identification information of the first edge node. The tunnel may be a generic routing encapsulation (GRE) tunnel, or may be an IP security (IPSec) tunnel, namely, an encrypted tunnel. Whether the created tunnel is encrypted may be set based on a user requirement, or may be encrypted or unencrypted by default. This is not limited in an embodiment of the application. For a tunnel creating process, refer to the conventional technology. Details are not described in an embodiment of the application.

In an embodiment, the first edge node includes the first primary edge node and the first secondary edge node. In this case, the first vCPE creates a tunnel between the first vCPE and the first primary edge node based on the identification information of the first primary edge node, and creates a tunnel between the first vCPE and the first secondary edge node based on the identification information of the first secondary edge node.

S105: The management and control device determines, based on the identification information of the first edge node, a forwarding path between each of the m VPCs and the first VPC on the cloud acceleration network, and delivers routing information of the forwarding path to each network node on the determined forwarding path.

A process in which the management and control device determines the forwarding path between each of the m VPCs and the first VPC on the cloud acceleration network based on the identification information of the first edge node, and delivers the routing information of the forwarding path to each network node on the determined forwarding path may be the same.

The following uses an example in which the management and control device determines, based on the identification information of the first edge node, a forwarding path used to forward a packet between the first VPC and a second VPC, and delivers routing information of the forwarding path to each network node on the determined forwarding path for description. Herein, the second VPC may be any one of the m VPCs, and an edge node corresponding to the second VPC is a second edge node.

In an embodiment, the management and control device determines, based on the identification information of the first edge node, identification information of the second edge node, and latency data of each network node in the latency database, a forwarding path that has minimum latency between the first edge node and the second edge node. A start point and an end point of the forwarding path are respectively the first edge node and the second edge node. For a process in which the management and control device determines the forwarding path between the first edge node and the second edge node, refer to the following process for determining a forwarding path that has minimum network latency between a network node 81 and a network node 85 in FIG. 8. Details are not described herein again.

If the forwarding path determined by the management and control device includes P network forwarding nodes (including the first edge node, the second edge node, and a forwarding node between the first edge node and the second edge node). The management and control device delivers routing information of the forwarding path to each of the P network forwarding nodes. For a $p^{th}$ network forwarding node of the P network forwarding nodes, the routing information is used to indicate a next-hop address of the $p^{th}$ network forwarding node when a destination address is an address of the first VPC or an address of the second VPC. P is a positive integer greater than or equal to 2, $1 \leq p \leq P$, and p is an integer. For example, for the $p^{th}$ network forwarding node, the routing information may be 10.2.0.0/16 nexthop 10.3.0.0/16, where 10.2.0.0/16 is the destination address, for example, may be an IP address of the first VPC or an IP address of the second VPC, and 10.3.0.0/16 is the next-hop IP address of the $p^{th}$ network forwarding node, for example, may be an IP address of a $(p+1)^{th}$ network forwarding node.

In an embodiment, in response to the operation of the management and control device, each of P forwarding nodes may store the routing information in a routing table of the node.

In an embodiment, the first edge node includes the first primary edge node and the first secondary edge node, and the second edge node includes a second primary edge node and a second secondary edge node. In this case, the management and control device determines, based on the identification information of the first primary edge node, identification information of the second primary edge node, and the latency data of each network node in the latency database, a primary forwarding path that has minimum latency between the first primary edge node and the second primary edge node. The primary forwarding path includes the first primary edge node and the second primary edge node. The management and control device may further determine, based on the identification information of the first secondary edge node, identification information of the second secondary edge node, and the latency data of each network node in the latency database, a secondary forwarding path that has minimum latency between the first secondary edge node and the second secondary edge node. The secondary forwarding path includes the first secondary edge node and the second secondary edge node.

It should be noted that there is no shared network node between the determined primary forwarding path and secondary forwarding path. In other words, the primary forwarding path and the secondary forwarding path used to forward the packet between the first VPC and the second VPC are two completely different forwarding paths, and certainly, are not limited thereto during implementation. Herein, the primary forwarding path is used for load bearing, and the secondary forwarding path is used for redundancy and backup. When the primary forwarding path works normally, the secondary forwarding path does not participate in packet forwarding. When the primary forwarding path cannot forward the packet due to a failure or system maintenance, the secondary forwarding path forwards the packet between the first VPC and the second VPC instead of the primary forwarding path. In other words, introduction of the secondary forwarding path improves reliability of multi-cloud interconnection, and ensures quality of a multi-cloud service.

In addition, if more than two VPCs are interconnected by using the cloud acceleration network, different forwarding paths (including different primary forwarding paths or different secondary forwarding paths) on the cloud acceleration network may share a node.

Figure 6:
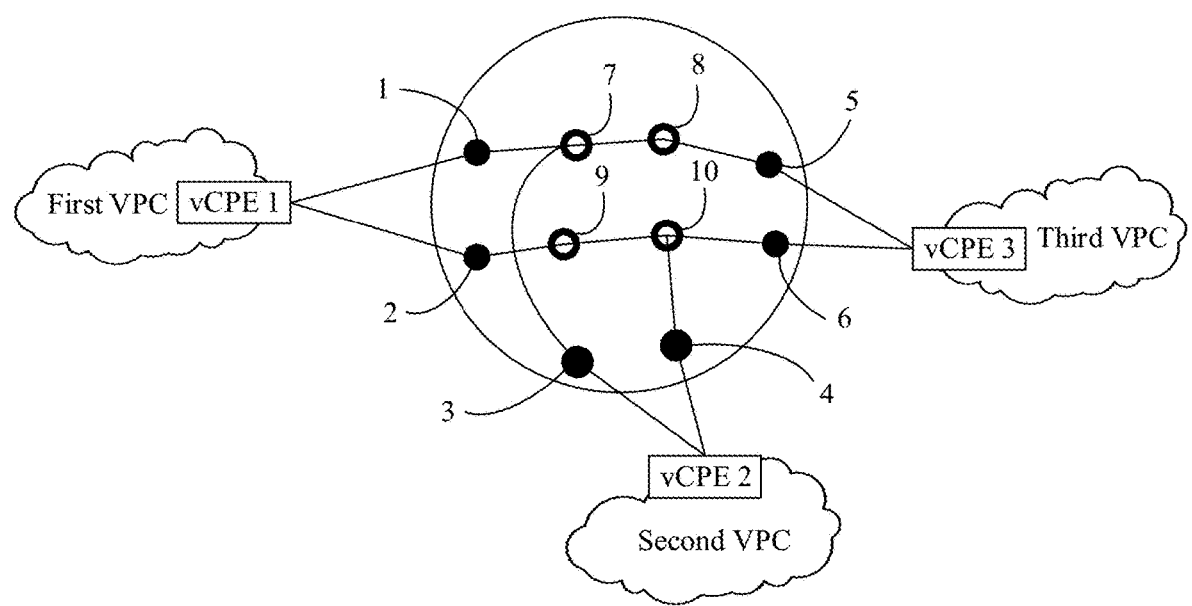
FIG. 6 is a schematic flowchart II of multi-cloud interconnection according to an embodiment of this application.

For example, FIG. 6 shows that three VPCs (a first VPC, a second VPC, and a third VPC) are interconnected by using the cloud acceleration network. A vCPE 1 is deployed on the first VPC, a vCPE 2 is deployed on the second VPC, and a vCPE 3 is deployed on the third VPC. A primary edge node corresponding to the first VPC may be an edge node 1, and a secondary edge node corresponding to the first VPC may be an edge node 2. A primary edge node corresponding to the second VPC may be an edge node 3, and a secondary edge node corresponding to the second VPC may be an edge node 4. A primary edge node corresponding to the third VPC may be an edge node 5, and a secondary edge node corresponding to the third VPC may be an edge node 6. Therefore, a primary forwarding path between the first VPC and the second VPC is a path 1-7-3, and a secondary forwarding path between the first VPC and the second VPC is a path 2-9-10-4. A primary forwarding path between the first VPC and the third VPC is a path 1-7-8-5, and a secondary forwarding path between the first VPC and the third VPC is a path 2-9-10-6. A primary forwarding path between the second VPC and the third VPC is a path 3-7-8-5, and a secondary forwarding path between the second VPC and the third VPC is a path 4-10-6.

The primary forwarding path (path 1-7-3) between the first VPC and the second VPC, the primary forwarding path (path 1-7-8-5) between the first VPC and the third VPC, and the primary forwarding path (path 3-7-8-5) between the second VPC and the third VPC share a forwarding node 7. The secondary forwarding path (path 2-9-10-4) between the first VPC and the second VPC, the secondary forwarding path (path 2-9-10-6) between the first VPC and the third VPC, and the secondary forwarding path (path 4-10-6) between the second VPC and the third VPC share a forwarding node 10.

It may be understood that a sequence of performing S103 to S104 and S105 is not limited in an embodiment of the application. For example, S103 to S104 may be performed before S105, or S103 to S104 and S105 may be simultaneously performed.

S106 (optional): The management and control device updates a forwarding path between each of edge nodes corresponding to the m VPCs and the first edge node.

The management and control device may periodically update the forwarding path between each of the edge nodes corresponding to the m VPCs and the first edge node. Manners in which the management and control device periodically updates the forwarding path between each of the edge nodes corresponding to the m VPCs and the first edge node may be the same. The following uses an example in which the forwarding path between the second edge node and the first edge node is periodically updated for description.

The management and control device periodically determines, based on latest network latency data of each network node in the latency database, a latest forwarding path that has minimum latency between the first edge node and the second edge node. Then, the management and control device determines whether the latest forwarding path is the same as the forwarding path already used to forward the packet between the first VPC and the second VPC. If the latest forwarding path is different from the forwarding path, the management and control device determines the latest forwarding path as the forwarding path used to forward the packet between the first VPC and the second VPC, and delivers latest routing information to each forwarding node on the latest path. If at a next moment of updating the forwarding path, a packet needs to be forwarded between the first VPC and the second VPC, the packet is forwarded through the updated forwarding path.

It may be understood that, if the primary forwarding path and the secondary forwarding path are included between the first VPC and the second VPC, both the primary forwarding path and the secondary forwarding path may be updated periodically.

By periodically updating the forwarding path for the packet between the first VPC and the second VPC, a problem, for example, a packet forwarding failure or packet forwarding latency, caused by unstable network quality can be reduced, and performance and availability of interconnection between the first VPC and the second VPC are improved.

At this point, the first VPC completes accessing the cloud acceleration network for interconnecting the m VPCs.

Embodiment 2

In an embodiment, the method for multi-cloud interconnection provided in embodiments of this application is described by creating a cloud acceleration network for interconnecting m VPCs, where the m VPCs include at least a first VPC and a second VPC.

Figure 7:
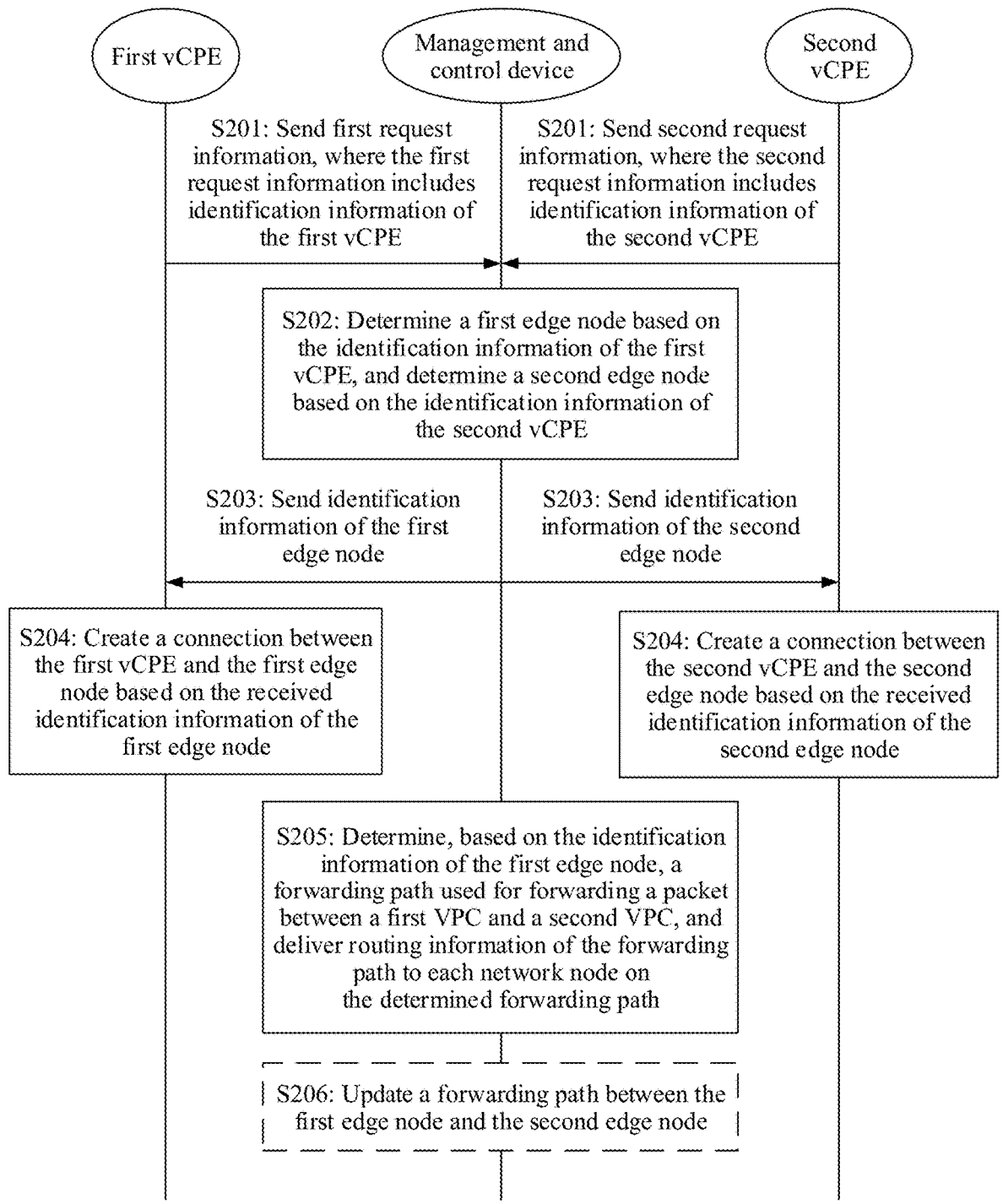
FIG. 7 is a schematic flowchart II of a method for multi-cloud interconnection according to an embodiment of this application.

The following uses a method for creating a cloud acceleration network for interconnecting the first VPC and the second VPC as an example for description. FIG. 7 is a schematic flowchart of the method. The method includes the following operations.

S201: A first vCPE sends first request information to a management and control device, where the first request information includes identification information of the first vCPE. A second vCPE sends second request information to the management and control device, where the second request information includes identification information of the second vCPE. The first vCPE is deployed on the first VPC, and the second vCPE is deployed on the second VPC.

The first request message and the second request message are used to request to interconnect the first VPC and the second VPC.

The identification information of the first vCPE may be an IP address of the first vCPE on a public network, and the identification information of the second vCPE may be an IP address of the second vCPE on the public network.

The management and control device receives the first request message in response to the operation of the first vCPE. The management and control device receives the second request message in response to the operation of the second vCPE.

S202: The management and control device determines a first edge node based on the identification information of the first vCPE, and determines a second edge node based on the identification information of the second vCPE.

S203: The management and control device sends identification information of the first edge node to the first vCPE, and sends identification information of the second edge node to the second vCPE.

S204: The first vCPE creates a connection between the first vCPE and the first edge node based on the received identification information of the first edge node. The second vCPE creates a connection between the second vCPE and the second edge node based on the received identification information of the second edge node.

S205: The management and control device determines, based on the identification information of the first edge node, a forwarding path used for forwarding a packet between the first VPC and the second VPC, and delivers routing information of the forwarding path to each network node on the determined forwarding path.

S206 (optional): The management and control device updates (for example, periodically updates) a forwarding path between the first edge node and the second edge node.

In an embodiment, for a implementation process of S202 to S206, refer to the implementation process of S102 to S106. Details are not described herein again.

At this point, creation of the cloud acceleration network for interconnecting the first VPC and the second VPC is completed.

The following describes a technical solution for determining a forwarding path provided in an embodiment of the application.

Each network node on a public cloud may pre-store identification information of each network node in a network node set corresponding to the network node, and the identification information may be an IP address. The network node set corresponding to the network node may be a set including all network nodes on the public cloud other than the network node, or a set including network nodes, that are at a distance less than or equal to a second preset distance from the network node, on the public cloud. The second preset distance may be set based on an actual situation. This is not limited in an embodiment of the application. The network node may detect (for example, periodically detect) network latency between each network node in the network node set and the network node based on the identification information of each network node in the network node set, and report a detected network latency result to the management and control device in real time. The network latency result may be represented by duration in a unit of millisecond (ms), for example, 0.1 ms. For a process in which the network node detects the network latency between each network node in the network node set and the network node, refer to the conventional technology. Details are not described herein. For example, the network node may detect the network latency between each network node in the network node set and the network node by using a ping command.

For example, Table 1 shows detected network latency results separately reported by a network node 1, a network node 2, a network node 3, and a network node 5 on the public cloud. Distances between the network node 2 and the network node 1 and between the network node 3 and the network node 1 are less than the second preset distance, a distance between the network node 2 and the network node 4 is less than the second preset distance, a distance between the network node 3 and the network node 5 is less than the second preset distance, and a distance between the network node 5 and the network node 4 is less than the second preset distance.

TABLE 1

| Network node | Network latency (ms) |
| --- | --- |
| Network node 1 and network node 2 | 1 |
| Network node 1 and network node 3 | 0.5 |
| Network node 2 and network node 4 | 1.5 |
| Network node 3 and network node 4 | 1 |
| Network node 4 and network node 5 | 0.8 |

In an embodiment, the management and control device stores, in a database (for example, a latency database), the network latency result reported by each network node. When receiving a result of network latency between two network nodes again, the management and control device updates network latency data of the network node in the latency database. The latency database may be used to determine a forwarding path having minimum network latency between any two network nodes on the public cloud.

Figure 8:
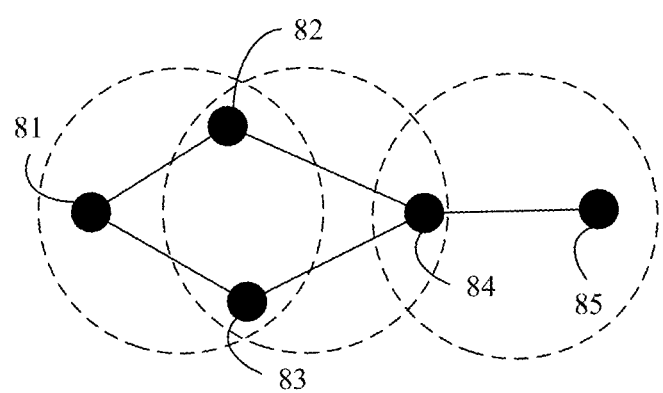
FIG. 8 is a schematic flowchart III of multi-cloud interconnection according to an embodiment of this application.

For example, FIG. 8 shows a network node 81, a network node 82, a network node 83, a network node 84, and a network node 85 on a public cloud. A diameter of a dashed circle shown in FIG. 8 may represent the second preset distance. It can be learned that both distances between the network node 82 and the network node 81 and between the network node 83 and the network node 81 are less than the second preset distance, both distances between the network node 82 and the network node 84 and between the network node 83 and the network node 84 are less than the second preset distance, and a distance between the network node 84 and the network node 85 is less than the second preset distance. There are two forwarding paths between the network node 81 and the network node 85, that is, a forwarding path A and a forwarding path B are included. The forwarding path A passes through the network node 81, the network node 82, the network node 84, and the network node 85 in sequence, and the forwarding path B passes through the network node 81, the network node 83, the network node 84, and the network node 85 in sequence.

If the network node 81 represents the network node 1 in Table 1, the network node 82 represents the network node 2 in Table 1, the network node 83 represents the network node 3 in Table 1, the network node 84 represents the network node 4 in Table 1, and the network node 85 represents the network node 5 in Table 1, the management and control device 30 may determine, based on the network latency between the network nodes shown in Table 1, that network latency of the forwarding path A is 3.3 (1+1.5+0.8) ms, and network latency of the forwarding path B is 2.3 (0.5+1+0.8) ms. In other words, the network latency of the forwarding path B is less than the network latency of the forwarding path A, that is, the management and control device may determine, based on the latency database, the forwarding path B having minimum network latency between the network node 81 and the network node 85.

The following describes a process for forwarding a packet between a first VPC and a second VPC by using a cloud acceleration network. A first vCPE is deployed on the first VPC, and a second vCPE is deployed on the second VPC.

Figure 9:
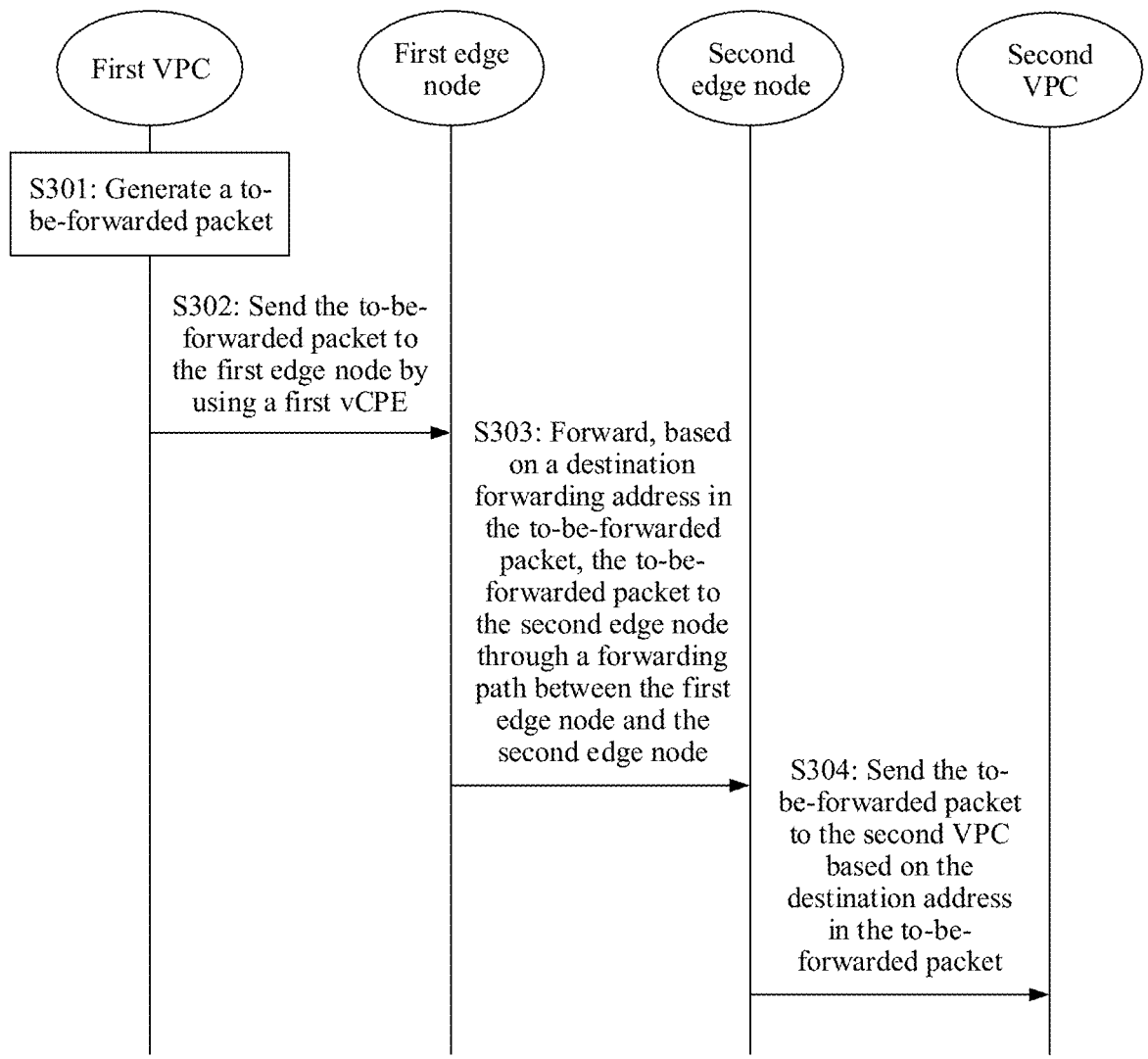
FIG. 9 is a schematic flowchart III of a method for multi-cloud interconnection according to an embodiment of this application.

FIG. 9 is a schematic flowchart of a method for forwarding the packet between the first VPC and the second VPC by using the cloud acceleration network. Herein, the first VPC and the second VPC may be the first VPC and the second VPC in Embodiment 1, or may be the first VPC and the second VPC in Embodiment 2. The method includes the following operations.

S301: The first VPC generates a to-be-forwarded packet.

The first VPC generates the to-be-forwarded packet, and the to-be-forwarded packet includes a destination forwarding address. Herein, the destination forwarding address in the to-be-forwarded packet may be an address of a second vCPE on a public network.

S302: The first VPC sends the to-be-forwarded packet to a first edge node by using a first vCPE.

A route to the second VPC is pre-configured on the first VPC. For example, the route may be "10.2.0.0/16 nexthop vCPE", where 10.2.0.0/16 is an IP address of the second VPC, and the vCPE is the first vCPE. In other words, when the destination address is 10.2.0.0/16, a next hop to which the route points is the first vCPE. Therefore, when the first VPC sends the to-be-forwarded packet to the second VPC, the first VPC first sends the generated to-be-forwarded packet to the first vCPE based on the foregoing route.

In the first vCPE, the first vCPE pre-configures a route to the second VPC. For example, the route may be a default route, that is, the first vCPE considers by default that a next-hop node is the first edge node connected to the first vCPE.

In an embodiment, the first vCPE encapsulates the to-be-forwarded packet by using a tunneling protocol, and sends an encapsulated to-be-forwarded packet to the first edge node through a tunnel between the first vCPE and the first edge node based on the default route of the first vCPE.

It may be understood that, if an edge node corresponding to the first vCPE includes a first primary edge node and a first secondary edge node, when the first vCPE does not receive a response packet of the to-be-forwarded packet within preset duration, the first vCPE encapsulates the to-be-forwarded packet by using a tunneling protocol, and sends an encapsulated to-be-forwarded packet to the first secondary edge node through a tunnel between the first vCPE and the first secondary edge node.

S303: The first edge node forwards, based on the destination forwarding address in the to-be-forwarded packet, the to-be-forwarded packet to a second edge node through a forwarding path between the first edge node and the second edge node.

In this operation, after receiving the to-be-forwarded packet from the first vCPE, the first edge node performs decapsulation by using the tunneling protocol to obtain the to-be-forwarded packet, and determines, based on the destination forwarding address (namely, an address of the second vCPE on the public network) in the to-be-forwarded packet, to forward the to-be-forwarded packet through the forwarding path between the first edge node and the second edge node. Correspondingly, the second edge node receives the to-be-forwarded packet through the forwarding path.

If the first secondary edge node receives the to-be-forwarded packet from the first vCPE, the first secondary edge node performs decapsulation by using the tunneling protocol to obtain the to-be-forwarded packet, and forwards, based on the destination forwarding address in the to-be-forwarded packet, the to-be-forwarded packet to the second edge node through a forwarding path between the first secondary edge node and a second secondary edge node. Correspondingly, the second secondary edge node receives the to-be-forwarded packet through the forwarding path.

S304: The second edge node sends the to-be-forwarded packet to the second VPC based on the destination address in the to-be-forwarded packet.

In an embodiment, the second edge node sends, based on the destination address in the to-be-forwarded packet, the to-be-forwarded packet to the second VPC by using the second vCPE. Correspondingly, the second VPC receives the to-be-forwarded packet from the first VPC.

At this point, it can be learned from the foregoing descriptions that, according to the method for multi-cloud interconnection provided in an embodiment of the application, the m VPCs are interconnected by using the cloud acceleration network. A routing device is deployed on each VPC, and the routing device is connected to an edge node on the cloud acceleration network, that is, each VPC may correspond to an edge node. In the cloud acceleration network, a forwarding path is established between every two edge nodes by using a network node, and the forwarding path is used to forward a packet between two VPCs corresponding to the two edge nodes.

In conclusion, according to the method for multi-cloud interconnection provided in an embodiment of the application, the m VPCs are interconnected by using the cloud acceleration network. When the m VPCs are interconnected, in an embodiment of the application, only a tunnel between each of the m VPCs and an edge node corresponding to the VPC needs to be established, without creating a fully interconnected tunnel between the m VPCs as in the conventional technology. In this way, when a VPC that needs to be interconnected is newly added, a tunnel between the VPC and an edge node is established according to the method for multi-cloud interconnection provided in an embodiment of the application, without creating a tunnel between the VPC and each of the m VPCs as in the conventional technology. In addition, in an embodiment of the application, the management and control device configures a forwarding path between the m VPCs on the cloud acceleration network. Compared with the conventional technology in which a fully interconnected tunnel needs to be created and a route needs to be manually configured when interconnection between the m VPCs is implemented, the method for multi-cloud interconnection provided in an embodiment of the application greatly reduces a configuration workload.

In addition, according to the method for multi-cloud interconnection provided in an embodiment of the application, when the m VPCs are interconnected by using the cloud acceleration network, a primary forwarding path for load bearing and a secondary forwarding path for redundancy and backup may be further established based on a level of a user. Compared with the conventional technology, an embodiment of the application improves a redundancy capability of multi-cloud interconnection, and ensures service quality of a multi-cloud service.

The foregoing mainly describes the solutions provided in embodiments of this application from a perspective of the methods. To implement the foregoing functions, corresponding hardware structures and/or software modules for performing the functions are included. One of ordinary skilled in the art should be easily aware that, with reference to units and algorithm operations in the examples described in embodiments disclosed in this specification, this application can be implemented in a form of hardware or a combination of hardware and computer software. Whether a function is performed by hardware or hardware driven by computer software depends on particular applications and design constraints of the technical solutions. One of ordinary skilled in the art may use different methods to implement the described functions for each particular application, but it should not be considered that the implementation goes beyond the scope of this application.

In an embodiment of the application, division into function modules may be performed on the management and control device and the first device (for example, the first vCPE) based on the foregoing method examples. For example, each function module may be obtained through division corresponding to each function, or two or more functions may be integrated into one processing module. The integrated module may be implemented in a form of hardware, or may be implemented in a form of a software function module. It should be noted that, in an embodiment of the application, division into the modules is an example, and is merely logical function division. In an embodiment, another division manner may be used.

Figure 10:
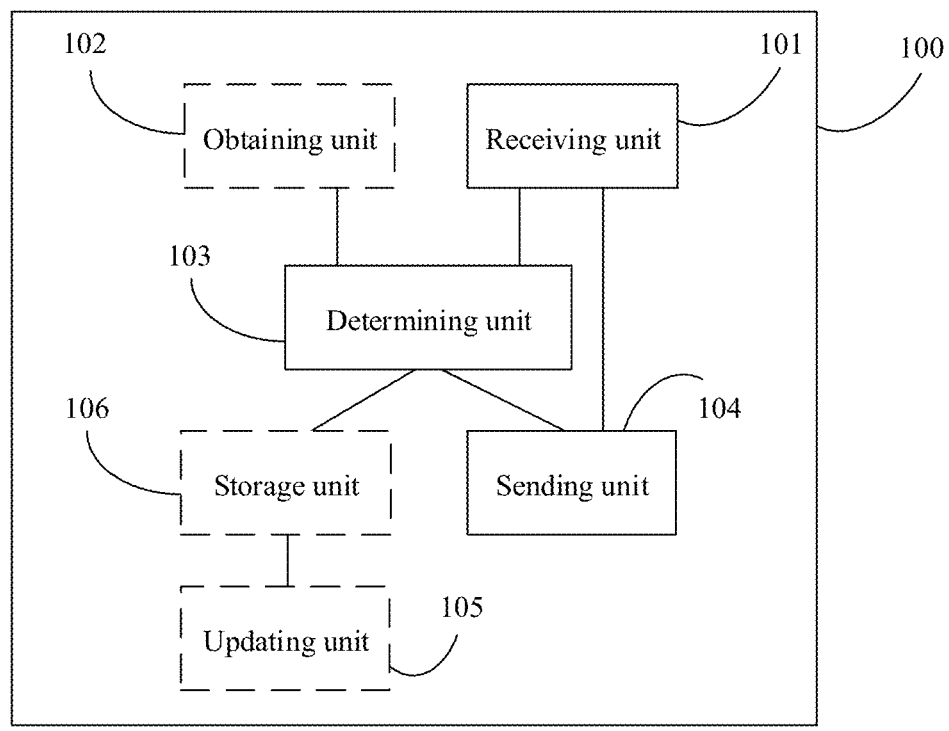
FIG. 10 is a schematic diagram of a structure of a management and control device according to an embodiment of this application.

FIG. 10 is a schematic diagram of a structure of a management and control device 100 according to an embodiment of this application. The management and control device 100 is configured to manage a plurality of network nodes, and is configured to perform the foregoing method for multi-cloud interconnection, for example, configured to perform the methods shown in FIG. 5 and FIG. 7. The management and control device 100 may include a receiving unit 101, a determining unit 103, and a sending unit 104.

The receiving unit 101 is configured to receive identification information of a first device, and the first device is deployed on a first virtual private cloud VPC. The determining unit 103 is configured to determine a first edge node based on the identification information of the first device received by the receiving unit 101. The first edge node is a network node, that is configured to connect to the first VPC, among the plurality of network nodes. The sending unit 104 is configured to send identification information of the first edge node determined by the determining unit 103 to the first device. The identification information of the first edge node is used by the first device to create a connection between the first device and the first edge node. The determining unit 103 is configured to determine a forwarding path between the first edge node and a second edge node in the plurality of network nodes. The forwarding path is used to forward a packet between the first VPC and a second VPC, and the second edge node is a network node, that is configured to connect to the second VPC, among the plurality of network nodes. For example, with reference to FIG. 5, the receiving unit 101 may be configured to respond to S101, the determining unit 103 may be configured to perform S1021, S1023, and S105, and the sending unit 104 may be configured to perform S103. With reference to FIG. 7, the receiving unit 101 may be configured to respond to S201, the determining unit 103 may be configured to perform S202 and S205, and the sending unit 104 may be configured to perform S203.

In an embodiment, the management and control device 100 further includes an obtaining unit 102. The obtaining unit 102 is configured to obtain network latency between each of at least two network nodes of the plurality of network nodes and the first device. The determining unit 103 is configured to determine the first edge node based on the network latency between each of the at least two network nodes and the first device. For example, with reference to FIG. 5, the obtaining unit 102 may be configured to perform S1022, and the determining unit 103 may be configured to perform S1023. With reference to FIG. 7, the determining unit 103 may be configured to perform S202.

In an embodiment, the at least two network nodes are network nodes, that are at a distance less than or equal to a first preset distance from the first device, in the plurality of network nodes.

In an embodiment, the first edge node includes a first primary edge node and a first secondary edge node, and the second edge node includes a second primary edge node and a second secondary edge node. In this case, the determining unit 103 is configured to determine a primary forwarding path between the first primary edge node and the second primary edge node in the plurality of network nodes, and configured to determine a secondary forwarding path between the first secondary edge node and the second secondary edge node in the plurality of network nodes. There is no shared network node between the primary forwarding path and the secondary forwarding path. For example, with reference to FIG. 5, the determining unit 103 may be configured to perform S105.

In an embodiment, network latency between the first primary edge node and the first device is less than or equal to network latency between the first secondary edge node and the first device. Network latency between the second primary edge node and a second device is less than or equal to network latency between the second secondary edge node and the second device, and the second device is deployed on the second VPC.

In an embodiment, network latency of the primary forwarding path is less than or equal to network latency of the secondary forwarding path.

In an embodiment, the management and control device 100 may further include an updating unit 105. The updating unit 105 is configured to update a forwarding path between each of edge nodes corresponding to the m VPCs and the first edge node. For example, with reference to FIG. 5, the updating unit 105 may be configured to perform S106. With reference to FIG. 7, the updating unit 105 may be configured to perform S206.

Certainly, the management and control device 100 provided in an embodiment of the application includes but is not limited to the foregoing units. For example, the management and control device 100 may further include a storage unit 106. The storage unit 106 may be configured to store program code of the management and control device 100, and may be further configured to store network latency data used to determine a forwarding path, for example, a latency database.

For descriptions of the foregoing optional manners, refer to the foregoing method embodiments. Details are not described herein again. In addition, for any explanation of the management and control device 100 provided above and descriptions of beneficial effects, refer to the foregoing corresponding method embodiments. Details are not described herein again.

For example, with reference to FIG. 4, the management and control device 100 may be implemented by using the computer device 40 in FIG. 4. In an embodiment, functions implemented by the receiving unit 101, the obtaining unit 102, and the sending unit 104 in the management and control device 100 may be implemented by the communication interface in FIG. 4. Functions implemented by the determining unit 103 and the updating unit 105 may be implemented by the processor 41 in FIG. 4 by executing the program code in the memory 42 in FIG. 4. A function implemented by the storage unit 106 may be implemented by the memory 42 in FIG. 4.

Figure 11:
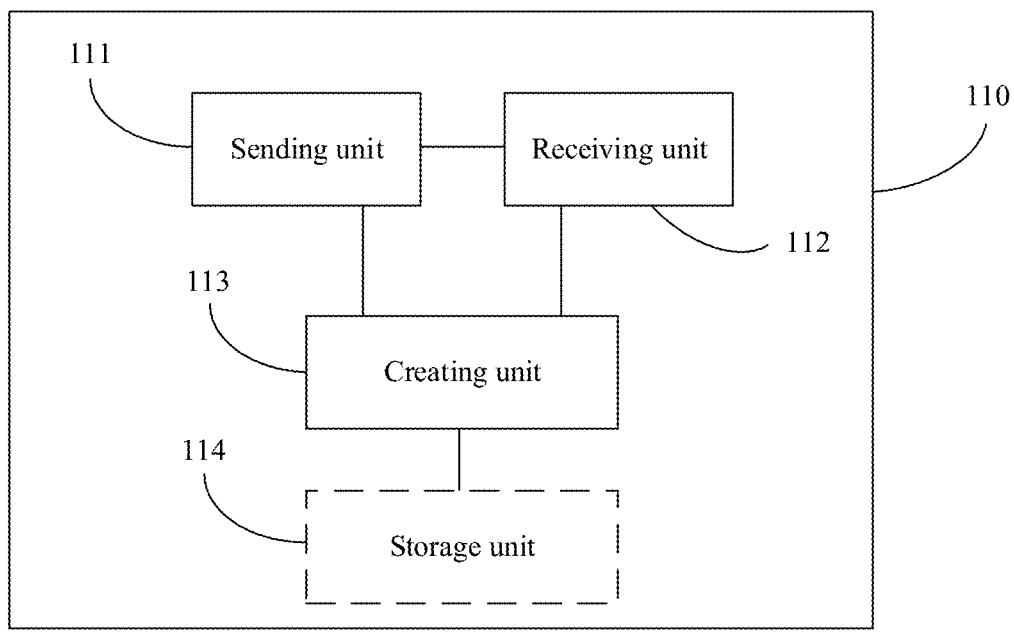
FIG. 11 is a schematic diagram of a structure of a first device according to an embodiment of this application.

FIG. 11 is a schematic diagram of a structure of a first device 110 according to an embodiment of this application. The first device 110 is deployed on a first virtual private cloud VPC, and is configured to perform the foregoing method for multi-cloud interconnection, for example, configured to perform the methods shown in FIG. 5 and FIG. 7. The first device 110 may include a sending unit 111, a receiving unit 112, and a creating unit 113.

The sending unit 111 is configured to send identification information of the first device 110 to a management and control device. The identification information of the first device 110 is used by the management and control device to determine a first edge node among a plurality of network nodes managed by the management and control device, and the first edge node is a network node, that is configured to connect to the first VPC, among the plurality of network nodes. The receiving unit 112 is configured to receive identification information of the first edge node sent by the management and control device. The creating unit 113 is configured to create a connection between the first device 110 and the first edge node based on the identification information of the first edge node received by the receiving unit 112. A packet between the first VPC and a second VPC is forwarded through a forwarding path, the forwarding path is a path between the first edge node and a second edge node in the plurality of network nodes, and the second edge node is a network node, that is configured to connect to the second VPC, among the plurality of network nodes. For example, with reference to FIG. 5, the sending unit 111 may be configured to perform S101, the receiving unit 112 may be configured to respond to S103, and the creating unit 113 may be configured to perform S104. With reference to FIG. 7, the sending unit 111 may be configured to perform S201, the receiving unit 112 may be configured to respond to S203, and the creating unit 113 may be configured to perform S204.

In an embodiment, the first edge node includes a first primary edge node and a first secondary edge node, and the second edge node includes a second primary edge node and a second secondary edge node. In this case, the creating unit 113 is configured to create a connection between the first device 110 and the first primary edge node based on identification information of the first primary edge node, and configured to create a connection between the first device 110 and the first secondary edge node based on identification information of the first secondary edge node. The forwarding path includes a primary forwarding path and a secondary forwarding path, the primary forwarding path is a path between the first primary edge node and the second primary edge node, the secondary forwarding path is a path between the first secondary edge node and the second secondary edge node, and there is no shared network node between the primary forwarding path and the secondary forwarding path. For example, with reference to FIG. 5, the creating unit 113 may be configured to perform S104. With reference to FIG. 7, the creating unit 113 may be configured to perform S204.

In an embodiment, network latency between the first primary edge node and the first device 110 is less than or equal to network latency between the first secondary edge node and the first device 110. Network latency between the second primary edge node and a second device is less than or equal to network latency between the second secondary edge node and the second device. The second device is deployed on the second VPC.

In an embodiment, network latency of the primary forwarding path is less than or equal to network latency of the secondary forwarding path.

Certainly, the first device 110 provided in an embodiment of the application includes but is not limited to the foregoing units. For example, the first device 110 may further include a storage unit 114. The storage unit 114 may be configured to store program code of the first device 110.

For descriptions of the foregoing optional manners, refer to the foregoing method embodiments. Details are not described herein again. In addition, for any explanation of the first device 110 provided above and descriptions of beneficial effects, refer to the foregoing corresponding method embodiments. Details are not described herein again.

For example, with reference to FIG. 4, the first device 110 may be implemented by using the computer device 40 in FIG. 4. In an embodiment, functions implemented by the receiving unit 112 and the sending unit 111 in the first device 110 may be implemented by the communication interface 43 in FIG. 4. A function implemented by the creating unit 113 may be implemented by the processor 41 in FIG. 4 by executing the program code in the memory 42 in FIG. 4. A function implemented by the storage unit 114 may be implemented by the memory 42 in FIG. 4.

Figure 12:
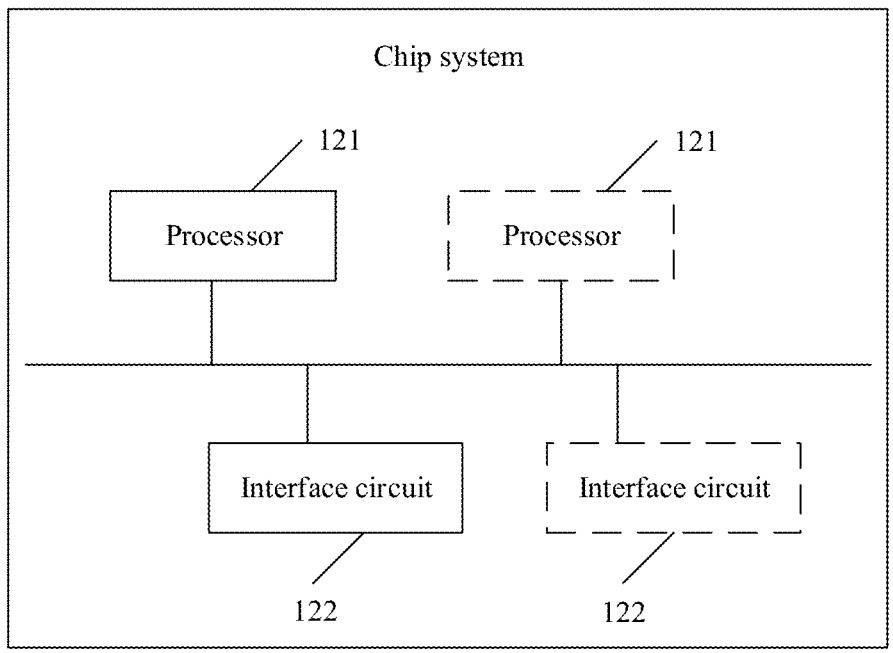
FIG. 12 is a schematic diagram of a structure of a chip system according to an embodiment of this application.

An embodiment of this application further provides a chip system. As shown in FIG. 12, the chip system includes at least one processor 121 and at least one interface circuit 122. The processor 121 and the interface circuit 122 may be interconnected through a line. For example, the interface circuit 122 may be configured to receive a signal from another apparatus (for example, a memory of a management and control device or a first device). For another example, the interface circuit 122 may be configured to send a signal to another apparatus (for example, the processor 121). For example, the interface circuit 122 may read instructions stored in the memory, and send the instructions to the processor 121. When the instructions are executed by the processor 121, the management and control device or the first device may be enabled to perform the operations in the foregoing embodiments. Certainly, the chip system may further include another discrete component. This is not limited in an embodiment of the application.

Another embodiment of this application further provides a computer-readable storage medium. The computer-readable storage medium stores instructions. When the instructions are run on a management and control device or a first device, the management and control device or the first device performs the operations performed by the management and control device or the first device in the method procedures shown in the foregoing method embodiments.

In some embodiments, the disclosed method may be implemented as computer program instructions encoded in a machine-readable format on a computer-readable storage medium or encoded on another non-transitory medium or product.

Figure 13:
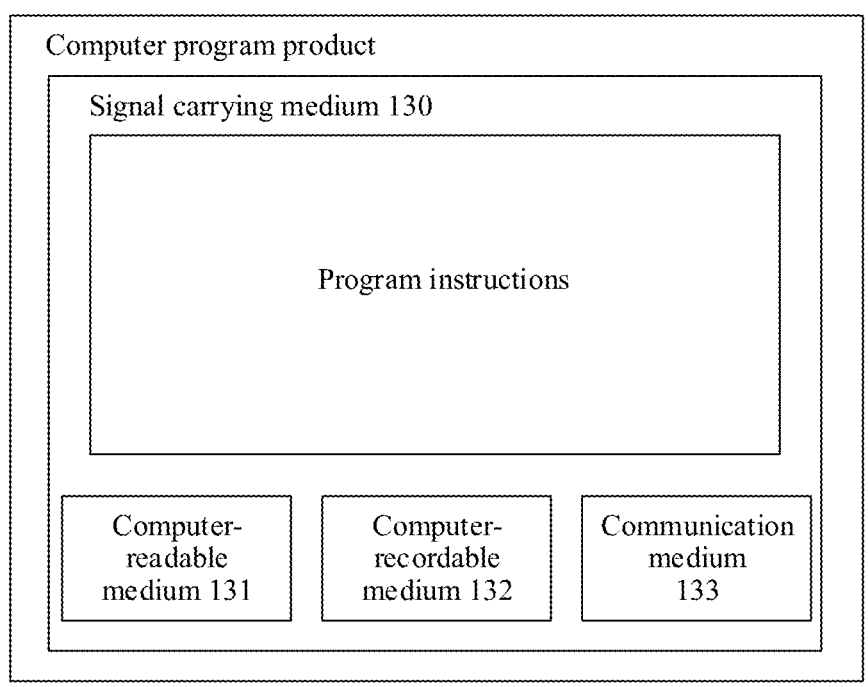
FIG. 13 is a schematic diagram of a structure of a computer program product according to an embodiment of this application.

FIG. 13 schematically shows a conceptual partial view of a computer program product according to an embodiment of this application. The computer program product includes a computer program used to execute a computer process on a computing device.

In an embodiment, the computer program product is provided by using a signal-carrying medium 130. The signal-carrying medium 130 may include one or more program instructions. When the one or more program instructions are run by one or more processors, the functions or some of the functions described in FIG. 5 may be provided. Therefore, for example, one or more features of S101-S106 in FIG. 5 or S201-S206 in FIG. 7 may be carried by one or more instructions associated with the signal-carrying medium 130. In addition, the program instructions in FIG. 13 are also described as example instructions.

In some examples, the signal-carrying medium 130 may include a computer-readable medium 131, for example, but not limited to, a hard disk drive, a compact disc (CD), a digital video disc (DVD), a digital tape, a memory, a read-only memory (ROM), or a random access memory (RAM).

In an embodiment, the signal-carrying medium 130 may include a computer-recordable medium 132, for example, but not limited to, a memory, a read/write (R/W) CD, or an R/W DVD.

In an embodiment, the signal-carrying medium 130 may include a communication medium 133, for example, but not limited to, a digital and/or analog communication medium (for example, an optical fiber cable, a waveguide, a wired communication link, or a wireless communication link).

The signal-carrying medium 130 may be conveyed by a wireless-form communication medium 133 (for example, a wireless communication medium that complies with the IEEE 802.11 standard or another transmission protocol). The one or more program instructions may be, for example, one or more computer-executable instructions or one or more logic implementation instructions.

In some examples, the management and control device or the first device described in FIG. 5 may be configured to provide various operations, functions, or actions in response to one or more program instructions in the computer-readable medium 131, the computer-recordable medium 132, and/or the communication medium 133.

It should be understood that the arrangement described herein is merely used as an example. Thus, one of ordinary skilled in the art appreciates that another arrangement and another element (for example, a machine, an interface, a function, a sequence, and a group of functions) can be used to replace the arrangement, and some elements may be omitted together depending on a desired result. In addition, many of the described elements are functional entities that can be implemented as discrete or distributed components, or implemented in any suitable combination at any suitable location in combination with another component.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer-executable instructions are loaded and executed on a computer, the procedures or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a DVD), a semiconductor medium (for example, a solid-state drive (SSD)), or the like.

The foregoing descriptions are merely implementations of this application. Any variation or replacement readily figured out by one of ordinary skilled in the art based on an embodiment provided in this application shall fall within the protection scope of this application.

What is claimed is:

1. A method for multi-cloud interconnection performed by a management and control device configured to manage a plurality of network nodes, comprising:
   receiving identification information of a first device deployed on a first virtual private cloud (VPC);
   determining a first edge node based on the identification information of the first device, wherein the first edge node is configured to connect to the first VPC, among the plurality of network nodes;
   sending identification information of the first edge node to the first device, wherein the identification information of the first edge node is used by the first device to create a connection between the first device and the first edge node; and
   determining a forwarding path between the first edge node and a second edge node in the plurality of network nodes, wherein the forwarding path is used to forward a packet between the first VPC and a second VPC, and wherein the second edge node is configured to connect to the second VPC, among the plurality of network nodes.

2. The method according to claim 1, wherein the determining the first edge node based on the identification information of the first device comprises:
   obtaining network latency between each of at least two network nodes of the plurality of network nodes and the first device; and
   determining the first edge node based on the network latency between each of the at least two network nodes and the first device.

3. The method according to claim 2, wherein the at least two network nodes are at a distance less than or equal to a first preset distance from the first device, in the plurality of network nodes.

4. The method according to claim 1, wherein the first edge node comprises a first primary edge node and a first secondary edge node, wherein the second edge node comprises a second primary edge node and a second secondary edge node, and wherein the determining the forwarding path between the first edge node and the second edge node in the plurality of network nodes comprises:
   determining a primary forwarding path between the first primary edge node and the second primary edge node in the plurality of network nodes; and
   determining a secondary forwarding path between the first secondary edge node and the second secondary edge node in the plurality of network nodes, wherein there is no shared network node between the primary forwarding path and the secondary forwarding path.

5. The method according to claim 4, wherein
   network latency between the first primary edge node and the first device is less than or equal to network latency between the first secondary edge node and the first device; and
   network latency between the second primary edge node and a second device is less than or equal to network latency between the second secondary edge node and the second device, and the second device is deployed on the second VPC.

6. The method according to claim 4, wherein
   network latency of the primary forwarding path is less than or equal to network latency of the secondary forwarding path.

7. A method for multi-cloud interconnection performed by a first device deployed on a first virtual private cloud (VPC), comprising:
   sending identification information of the first device to a management and control device, wherein the identification information of the first device is used by the management and control device to determine a first edge node among a plurality of network nodes managed by the management and control device, and wherein the first edge node is configured to connect to the first VPC, among the plurality of network nodes;
   receiving identification information of the first edge node sent by the management and control device; and
   creating a connection between the first device and the first edge node based on the identification information of the first edge node, wherein a packet between the first VPC and a second VPC is forwarded through a forwarding path between the first edge node and a second edge node in the plurality of network nodes, and wherein the second edge node is configured to connect to the second VPC, among the plurality of network nodes.

8. The method according to claim 7, wherein the first edge node comprises a first primary edge node and a first secondary edge node, and wherein the second edge node comprises a second primary edge node and a second secondary edge node; and
   the creating the connection between the first device and the first edge node based on the identification information of the first edge node comprises:
   creating a connection between the first device and the first primary edge node based on identification information of the first primary edge node, and
   creating a connection between the first device and the first secondary edge node based on identification information of the first secondary edge node, wherein
   the forwarding path comprises a primary forwarding path and a secondary forwarding path, wherein the primary forwarding path is between the first primary edge node and the second primary edge node, wherein the secondary forwarding path is between the first secondary edge node and the second secondary edge node, and wherein there is no shared network node between the primary forwarding path and the secondary forwarding path.

9. The method according to claim 8, wherein
network latency between the first primary edge node and the first device is less than or equal to network latency between the first secondary edge node and the first device; and
network latency between the second primary edge node and a second device is less than or equal to network latency between the second secondary edge node and the second device deployed on the second VPC.

10. The method according to claim 8, wherein
network latency of the primary forwarding path is less than or equal to network latency of the secondary forwarding path.

11. A management and control device, comprising:
a processor,
a memory coupled to the processor to store instructions, and when executed by the processor, cause the management and control device to perform operations, the operations comprising:
receiving identification information of a first device deployed on a first virtual private cloud (VPC);
determining a first edge node based on the identification information of the first device, wherein the first edge node is configured to connect to the first VPC, among a plurality of network nodes;
sending identification information of the first edge node to the first device, wherein the identification information of the first edge node is used by the first device to create a connection between the first device and the first edge node; and
determining a forwarding path between the first edge node and a second edge node in the plurality of network nodes, wherein the forwarding path is used to forward a packet between the first VPC and a second VPC, and wherein the second edge node is configured to connect to the second VPC, among the plurality of network nodes.

12. The device according to claim 11, wherein the determining the first edge node based on the identification information of the first device comprises:

obtaining network latency between each of at least two network nodes of the plurality of network nodes and the first device; and
determining the first edge node based on the network latency between each of the at least two network nodes and the first device.

13. The device according to claim 12, wherein the at least two network nodes are at a distance less than or equal to a first preset distance from the first device, in the plurality of network nodes.

14. The device according to claim 11, wherein the first edge node comprises a first primary edge node and a first secondary edge node, wherein the second edge node comprises a second primary edge node and a second secondary edge node, and wherein the determining the forwarding path between the first edge node and the second edge node in the plurality of network nodes comprises:
determining a primary forwarding path between the first primary edge node and the second primary edge node in the plurality of network nodes; and
determining a secondary forwarding path between the first secondary edge node and the second secondary edge node in the plurality of network nodes, wherein there is no shared network node between the primary forwarding path and the secondary forwarding path.

15. The device according to claim 14, wherein
network latency between the first primary edge node and the first device is less than or equal to network latency between the first secondary edge node and the first device; and
network latency between the second primary edge node and a second device is less than or equal to network latency between the second secondary edge node and the second device, and the second device is deployed on the second VPC.

16. The device according to claim 14, wherein
network latency of the primary forwarding path is less than or equal to network latency of the secondary forwarding path.

* * * * *